United States Patent [19]

Okamoto et al.

[11] 4,377,400
[45] Mar. 22, 1983

[54] HEAT EXCHANGER

[75] Inventors: Kunio Okamoto; Akira Fukami, both of Okazaki, Japan

[73] Assignee: Nippon Soken, Inc., Nishio, Japan

[21] Appl. No.: 318,563

[22] Filed: Nov. 5, 1981

[30] Foreign Application Priority Data

Nov. 11, 1980 [JP] Japan ................. 55-158956
Nov. 12, 1980 [JP] Japan ................. 55-159827
Feb. 18, 1981 [JP] Japan ................. 56-22806

[51] Int. Cl.³ .......................... B01D 51/00
[52] U.S. Cl. ......................... 55/269; 55/158; 55/387; 55/388; 55/389; 165/166
[58] Field of Search ............. 55/158, 316, 278, 387, 55/388, 389, 390; 165/166; 162/145, 146, 129

[56] References Cited

U.S. PATENT DOCUMENTS

| | | | |
|---|---|---|---|
| 3,513,643 | 5/1970 | Tarala | 55/497 |
| 4,181,513 | 1/1980 | Fukuda et al. | 55/316 |
| 4,234,326 | 11/1980 | Bailey et al. | 55/387 |

FOREIGN PATENT DOCUMENTS

| | | | |
|---|---|---|---|
| 50-22365 | 7/1975 | Japan . | |
| 55-72797 | 5/1980 | Japan | 55/388 |
| 56-3900 | 1/1981 | Japan | 55/387 |
| 56-30595 | 3/1981 | Japan | 55/387 |
| 56-31423 | 3/1981 | Japan | 55/387 |

*Primary Examiner*—Bernard Nozick
*Attorney, Agent, or Firm*—Cushman, Darby & Cushman

[57] ABSTRACT

A heat exchanger for use in a ventilation system to exchange both of actual heat and latent heat between outgoing room air and incoming fresh air has a laminated structure formed by flat partition plates and corrugated spacer plates each sandwiched between an adjacent pair of the partition plates. The two kinds of plates are arranged such that a first series of passages for the outgoing room air and a second series of passages for the incoming fresh air are defined between respective adjacent pairs of the partition plates and the spacer plates. The first and second series of passages are at an angle with respect to each other. At least the partition plates are made of a paper-like material formed, by a process similar to ordinary paper making process, from a mixture of carbon fibers and binding fibers.

1 Claim, 5 Drawing Figures

HEAT EXCHANGER

BACKGROUND OF THE INVENTION

1. Field of the Invention

The present invention relates to a heat exchanger capable of exchanging heat between two kinds of fluids having different temperatures and humidities. More particularly, the invention is concerned with a heat exchanger which can perform, in ventilating an air-conditioned room or compartment of a house, automobile or the like, an exchange of heat between the outgoing air discharged to the outside and the incoming air introduced from the outside to thereby recover the heat which otherwise is carried away by the outgoing air to be wasted.

2. Description of the Prior Art

To comply with the demand stated above, the heat exchanger must be capable of exchanging heat in both aspects of actual heat and latent heat between the outgoing air and incoming air. Unfortunately, however, the conventional heat exchangers constructed with metals can make the exchange of the actual heat only. In consequence, the heat exchanging efficiency is undesirably lowered particularly when the latent heat occupies a large part of the total heat including actual heat and latent heat.

In order to overcome this problem, a heat exchanger has been proposed which incorporates a heat exchanging material having a low heat conductivity, such as asbestos, and impregnated with a moisture adsorbent, such as lithium chloride, thereby to recover the latent heat. This type of heat exchanger, however, is needs a complicated process of manufacture and thus is expensive.

Japanese Utility Model Publication No. 50-22365 (22365/1975) discloses a heat exchanger in which the heat is exchanged across a Japanese paper. The Japanese paper, although it can contribute to some extent to the exchange of latent heat, has poor heat transmitting and moisture permeating characteristics, so that the heat exchanging capacity of the heat exchanger is low relative to the size of the heat exchanger.

It is also to be pointed out that none of the heat exchangers proposed and used hitherto has a function to remove contaminants suspended by the incoming fresh air, so that the contaminated air is introduced into the room.

SUMMARY OF THE INVENTION

Accordingly, an object of the invention is to provide a heat exchanger which is capable of effectively exchanging both of heat and moisture and has a function to adsorb and remove any contaminant suspended by the ambient air thereby to prevent the contaminant from being introduced into the room.

To this end, according to the invention, there is provided a heat exchanger having a laminated structure constituted by a plurality of flat partition plates and corrugated spacer plates sandwiched between adjacent partition plates, the corrugated spacer plates being arranged such that the ridges of corrugations of adjacent layers cross each other, wherein the partition plate is formed from a paper-like material composed of a mixture of carbon system fibers and binding fibers in which the carbon system fibers occupy 50 to 90% of the mixture.

The above and other objects, features and advantages of the invention will become clear from the following description of preferred embodiments of the invention with reference to the accompanying drawings.

DESCRIPTION OF THE PREFERRED EMBODIMENTS

Figure 1:
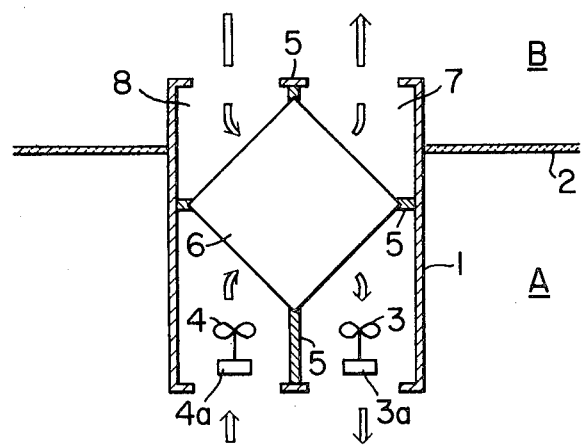
FIG. 1 is a schematic illustration of a ventilation system incorporating a heat exchanger constructed in accordance with an embodiment of the invention.

Referring first to FIG. 1 showing a ventilation system incorporating a heat exchanger of the invention, a ventilation duct 1 is fixed, by means of bolts (not shown) or the like, to a wall 2 which separates the space A in a room from the outside space B. The space in the duct 1 is divided by partition walls 5 into a room air passage 7 through which the air is discharged from the inside space A to the outside space B, and a fresh air passage 8 through which the ambient fresh air is introduced from the outside space B into the inside space A. These passages 7 and 8 are provided with electrically driven blowers 3 and 4, respectively, to positively create the outgoing and incoming flows of air through these passages. Needless to say, these blowers 3 and 4 may be driven by a common electric motor, although independent motors 3a and 4a are provided in the illustrated embodiment.

As will be understood from FIG. 1, the partition walls 5 are arranged such that the air passages 7 and 8 cross each other substantially orthogonally. A heat exchanger 6 is disposed at the point where the two air passages 7 and 8 cross each other.

Figure 2:
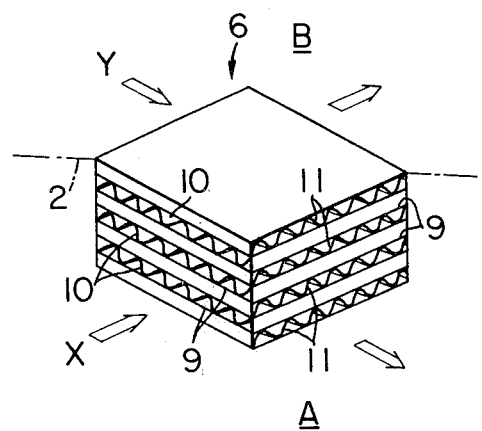
FIG. 2 is a perspective view of the heat exchanger shown in FIG. 1.

Referring now to FIG. 2, the heat exchanger 6 has a laminated structure formed by flat partition plates 9 and corrugated spacer plates 10 and 11 each sandwiched between an adjacent pair of the partition plates 9. The corrugated spacer plates 10 and 11 are arranged such that the ridge lines of the corrugation of the spacer plates 10 are substantially at right angles to those of the corrugated spacer plates 11 so that the spacer plates 10 and the partition plates 9 cooperate to define a first series of passages for the outgoing room air indicated by an arrow X while the spacer plates 11 and the partition plates 9 cooperate to define a second series of passages for the incoming fresh air indicated by an arrow Y. The first and second series of the passages are substantially at right angles in the illustrated embodiment of the invention but may alternatively be at an angle other than 90°.

In the described embodiment, the flat partition plate 9 is made from a paper of activated carbon. This paper of activated carbon is produced by activating carbon fibers into activated carbon fibers, mixing the activated carbon fibers with binding fibers such as fibrous polyvinyl alcohol and/or cellulose fibers, and then making the paper from this mixture in the same manner as the making of the Japanese paper.

This paper made from the activated carbon fibers inherently has a characteristics similar to those of solid carbon. Namely, it exhibits a higher heat conductivity than the ordinary papers such as Japanese paper consisting solely of organic cellulose material. In addition, the activated carbon powder paper has a large surface area. For these reasons, the paper made from activated carbon fibers provides a very high heat exchanging efficiency. Furthermore, the exchange of moisture can be achieved more effectively than in the case of ordinary papers, due to a combination of the moisture permeability caused by diffusion of molecules of vapor and due to the capillary action offered by the fine fibers of the activated carbon.

Figure 3:
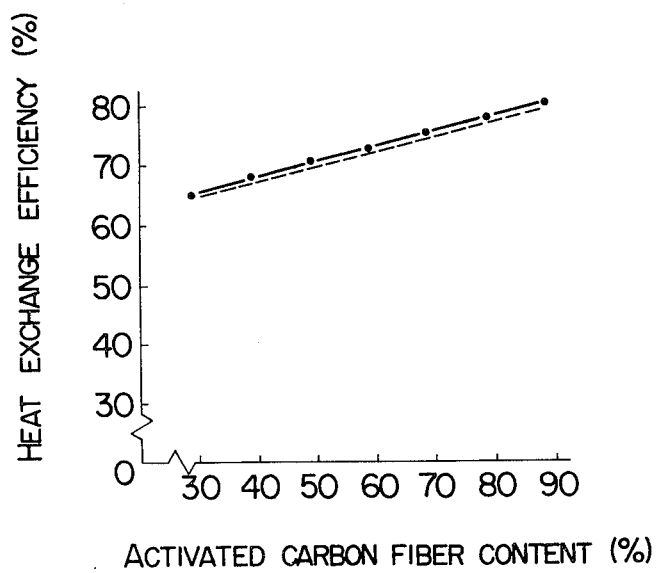
FIG. 3 is a graph showing the relationship between the activated carbon fiber content and the heat exchange efficiency.
Figure 4:
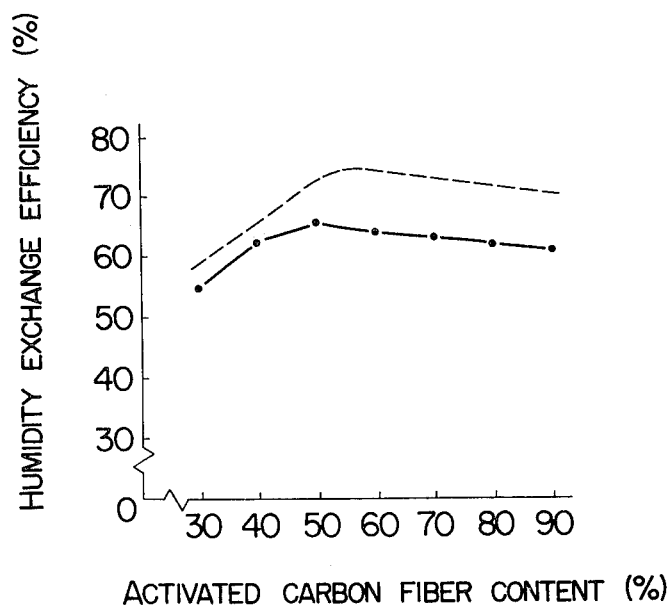
FIG. 4 is a graph showing the relationship between the activated carbon fiber content and the humidity exchange efficiency.

A plurality of heat exchangers having the laminated structure shown in FIG. 2 where produced with the ratios between the activated carbon fibers and binding fibers being widely varied. A series of tests was conducted with these heat exchangers in order to investigate the relationship between the mixing ratio and the performance of the heat exchanger. The test results are as shown in FIGS. 3 and 4. Namely, FIG. 3 shows a graph in which the abscissa represents the activated carbon content (%) while the ordinate represents a heat exchange efficiency (%). In FIG. 4, the abscissa represents the activated carbon content (%) while the ordinate indicates the humidity exchange efficiency (%). In these graphs, the full line curves show the characteristics actually measured when the flat partition plates were not impregnated with any agent while broken line curves show the characteristics as observed when the flat partition plates were impregnated with lithium chloride.

As will be seen from FIG. 3, a higher heat exchange efficiency is achieved as the activated carbon content becomes greater. In contrast, the humidity exchange efficiency exhibits a peak value at 50% of the activated carbon content and is slightly decreased as the activated carbon content is increased beyond 50%, as shown in FIG. 4. Therefore, taking into account the humidity exchange efficiency solely, the activated carbon content may preferably be selected to range between 40 and 70%. However, in the heat exchanger which is intended to exchange both of actual and latent heats, it is more preferable that both of the heat exchange efficiency and the humidity exchange efficiency are high. From this point of view, the activated carbon content should fall within the range of between 50 and 90%.

The effect of impregnation with lithium chloride will be explained hereinunder. As will be seen from FIG. 3, no substantial change of heat exchange efficiency is caused by the impregnation with lithium chloride. On the other hand, the humidity exchange efficiency is considerably improved by the impregnation with lithium chloride. This is attributable to the moisture adsorption and releasing effect of the lithium chloride in combination with the aforesaid advantageous effect of the activated carbon fibers. The effect of the lithium chloride is remarkable particularly in the region of activated carbon content of higher than 50%. This is considered to be because the combined effect of the lithium chloride and the activated carbon fibers is remarkable and effective particularly in this region of activated carbon content. Therefore, also from this point of view, the activated carbon content preferably ranges between 50 and 90%.

The heat exchanger described above can suitably be used in a ventilation system in which a heat exchange is made between the outgoing room air x and the incoming fresh air Y. For instance, in the summer season in which the temperature and humidity of ambient air are generally high, the heat and humidity are exchanged between the hot and humid incoming air and the cooled and less-humid outgoing air, so that the outdoor air is effectively cooled and dehumidified before it is introduced into the air-conditioned room. To the contrary, in the winter season in which the outdoor air is generally chill and dry, the outdoor air is heated and humidified by the heat and humidity exchange with the hotter and humid room air. In consequence, the increase in the load on the air conditioner due to the ventilation is effectively reduced or eliminated.

Furthermore, according to the invention, it is possible to obtain a deodorant effect. Namely, an offensive odor content of outdoor air, if any, is effectively adsorbed and removed as the incoming air contacts the activated carbon fibers. This is also true with the removal of any noxious component such as carbon monoxide gas contained by the outdoor air. The paper of activated carbon fibers can hardly be burnt in ordinary state of use and thus offers also a higher safety over the Japanese paper or the like material.

In order to enhance the deodorant and cleaning effects stated above, it is preferred that not only the partition plates 9 but also the spacer plates 11 faced to the passages for fresh air Y are formed from the paper of activated carbon fibers. It is also possible to form both of the spacer plates 10 and 11, which are faced to the passages for fresh air and room air, from the activated carbon fibers. By so doing, it is possible to obtain a greater surface area of the activated carbon fibers, which in turn ensures a higher heat conductivity and, hence, a higher heat exchange efficiency. The production of the partition plates 9 and the spacer plates 10 and 11 from the same material, i.e., the activated carbon fiber paper, is advantageous also from the view point of efficiency of the production.

In the embodiment described above, the paper material, i.e., the activated carbon fiber paper, is produced by activating carbon fibers and then mixing the activated carbon fibers with the binding fibers. This, however, is not exclusive. Namely, advantageous results substantially equivalent to those shown in FIGS. 3 and 4 were obtained from a carbon fiber paper which was formed by simply mixing the carbon fibers with the binding fibers. It is, therefore, preferred that the carbon fiber content preferably ranges between 50 and 90% also in this case. In the case where the non-activated carbon fiber paper is used, the surface area is increased to a certain extent over that provided by ordinary papers due to the presence of carbon fibers projecting in a cilia-like manner, although the increase in the surface area is smaller than that provided by the paper of activated carbon fibers. The paper of non-activated carbon fibers, therefore, can suitably be used as the material of the layers having the smaller demand for deodorant and cleaning effects, such as the partition plates 9 and the spacer plates 10 faced to the passages for the outgoing room air X.

As has been described, the present invention provides a heat exchanger having a laminated structure including partition plates and corrugated spacer plates each sandwiched between an adjacent pair of partition plates, wherein at least the partition plates are formed from a paper-like material which is made from a mixture of fibers of carbon system such as carbon fibers or activated carbon fibers and binding fibers, the fibers of carbon system occupying 50 to 90% of the mixture of fibers. This heat exchanger is quite effective in exchanging not only heat but also humidity as well between two fluids which flow through the heat exchanger in two different directions.

Figure 5:
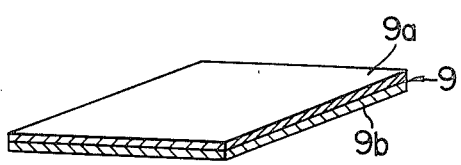
FIG. 5 is a perspective view of a partition plate incorporated in a heat exchanger of a second embodiment of the invention.

Referring now to FIG. 5 showing a second embodiment of the invention, each partition plate 9 is formed by a paper 9a of non-activated carbon fibers and a paper 9b of activated carbon fibers. The paper 9a is disposed adjacent to the side of the spacer plate 10 which is faced to the passages for the room air while the paper 9b is disposed adjacent to the side of the spacer plate 11 which is faced to the passages for the fresh incoming air.

The non-activated carbon fiber paper which constitutes each spacer plate 10 and the side 9a of each partition plate 9 faced to the passages for the room air is produced by mixing the carbon fibers with cellulose and fibrous polyvinyl alcohol and then forming the mixture into paper sheets by means of a paper making machine. On the other hand, the activated carbon fiber paper constituting each spacer plate 11 and the side 9b of each partition plate 9 faced to the fresh air passages is produced by mixing activated carbon fibers with fibrous polyvinyl alcohol and forming the mixture into paper sheets by means of a paper making machine. The partition plate 9 can easily be formed by using a combination type paper making machine in which a paper sheet of activated carbon fibers and the paper sheet of non-activated carbon fibers are joined together.

In this embodiment of the invention, the spacer plate 10 faced to the passages for the room air and the side 9a of the partition plate 9 faced to the passages for the outgoing room air are made from carbon fiber paper sheet having no positive adsorbing function. Therefore, the contaminants suspended by the outgoing room air can be discharged to the outside without attaching to the walls of the room air passages. In addition, since the spacer plate 11 faced to the fresh air passages and the side 9b of the partition plate 9 faced to the incoming air passages are made of paper sheets of activated carbon fibers having the adsorbing function, the contaminants suspended by the outdoor air, if any, can effectively be adsorbed and removed before the air is introduced into the room.

The reason why the portions to be contacted by the outgoing room air are made of paper sheets having no adsorption function is because, if the side 9a of the partition plate 9 faced to the outgoing room air passages were made from the paper sheet of activated carbon fibers having the adsorption function, it will adsorb a large amount of contaminants suspended by the outgoing room air. In this concern, it is to be noted that the room air is usually contaminated more heavily than the outdoor fresh air. In consequence, a large difference in concentration of contaminants is formed between both sides 9a and 9b of the partition plate 9 across the thickness thereof. This in turn causes a penetration of the contaminants from the heavier contamination side 9a to the other side 9b which is faced to the incoming fresh air passages to thereby cause an increase in the contaminants on the side 9b of the partition plate 9. In consequence, the contaminants on the side 9b are removed therefrom by the incoming fresh air flowing in contact with the side 9b of the partition plate 9 and are conveyed thereby into the room. This problem, however, can be fairly avoided by the embodiment of the invention shown in FIG. 5 as will be apparent to those in the art from the foregoing description.

The invention is not limited to the described and illustrated embodiments of the invention and may have various changes and modifications. For example, it is possible to form the spacer plates 11 by Zeolite (Trade Name) having an adsorption function. The two kinds of paper sheets constituting the two sides 9a and 9b of each partition plate 11 may be prepared separated and disposed merely in contact with each other. Alternatively, these two kinds of paper sheets may be secured together by means of an adhesive such as starch adhesive or the like. It is also possible to increase the moisture adsorption effects of both sides 9a and 9b of the partition plates 9 by adding a cellulose, gypsum or the like material to the carbon fibers or activated carbon fibers.

From the foregoing description, it will be understood that the present invention provides an improved heat exchanger which can effectively exchange both of actual heat and latent heat between two kinds of fluids having different temperatures and humidities. Particularly, the second embodiment described with reference to FIG. 5 ensures the introduction of clean fresh air into an air-conditioned room because the sides of the partition plates faced to the passages for the outgoing room air are made of a material having no positive adsorption function while the sides of the partition plates faced to the fresh incoming air passages are made of a material having positive adsorption function.

It is to be understood that the word "plate" used herein embraces a thin and flexible sheet material and that the word "paper" also used herein embraces a paper-like material such as non-woven fabric.

What is claimed is:

1. A heat exchanger for use in a ventilation system having a first path of outgoing room air and a second path of incoming fresh air, said heat exchanger being adapted to be disposed at the point where said first and second paths cross each other and to perform exchange of both of actual and latent heat between said outgoing and incoming airs, said heat exchanger comprising a laminated structure formed by at least two corrugated sheets wherein the ridges of adjacent sheets cross each other and a substantially flat partition laminate sheet capable of transferring moisture, actual and latent heat sandwiched between said corrugated sheets, one of said corrugated sheets cooperating with one side layer of said partition sheet to define a first series of passages for the outgoing air, the other corrugated sheet cooperating with the other side layer of said partition sheet to define a second series of passages for the incoming air, wherein said the other side layer of said partition sheet is formed of a paper-like material including activated carbon fibers capable of adsorbing contaminants suspended by air and said one side layer of said partition sheet is formed of a paper-like material including non-activated carbon fibers incapable of adsorbing contaminants suspended by air.

* * * * *